Sept. 11, 1928.  
C. BERGER  
1,684,212  
INDICATING CHART AND MEANS FOR VIEWING THE SAME  
Filed April 28, 1921 3 Sheets-Sheet 1

Inventor  
Christian Berger  
By his Attorneys  
Kerr Page Cooper + Hayward

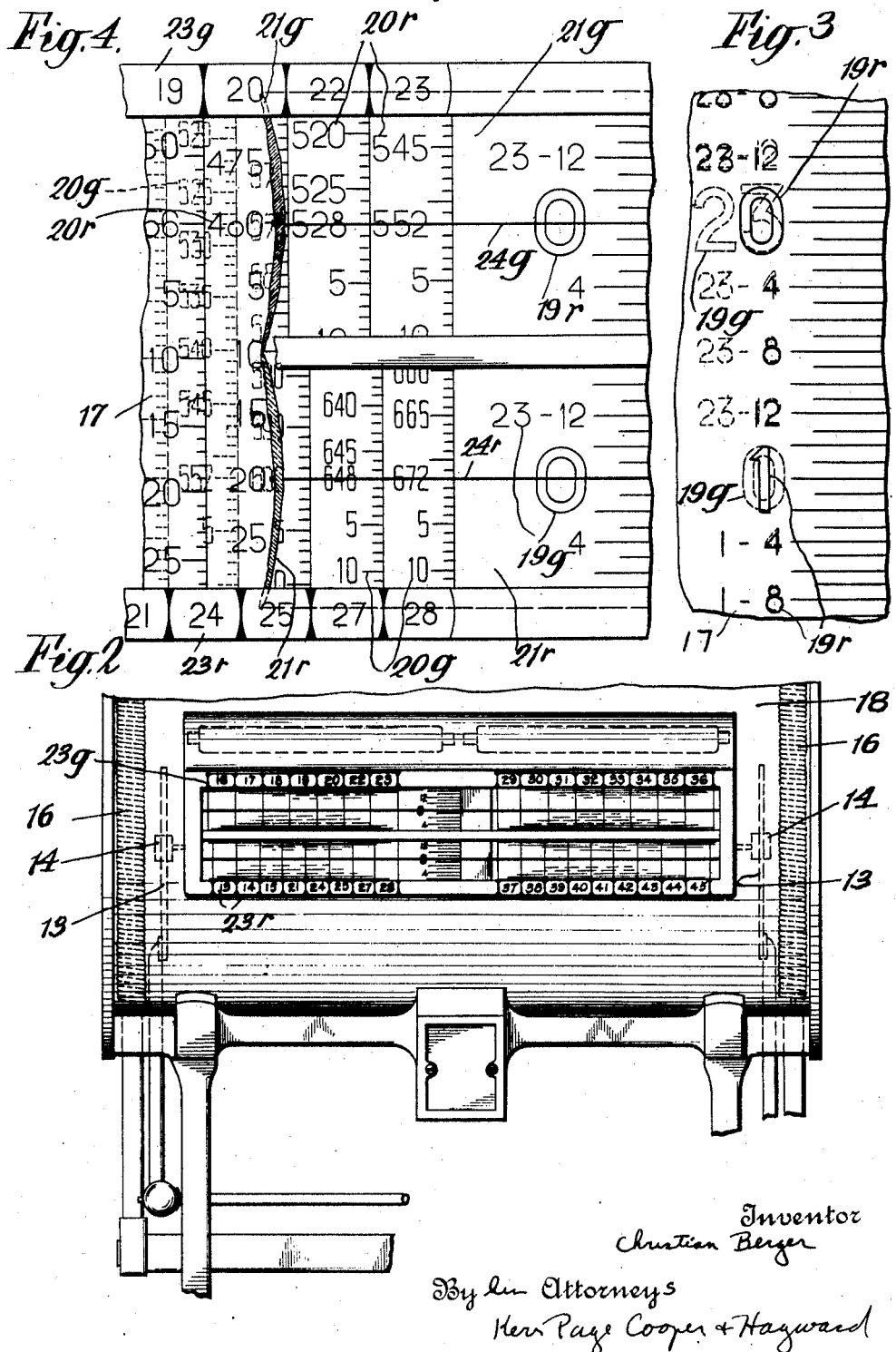

Sept. 11, 1928.  1,684,212
C. BERGER
INDICATING CHART AND MEANS FOR VIEWING THE SAME
Filed April 28, 1921   3 Sheets-Sheet 3
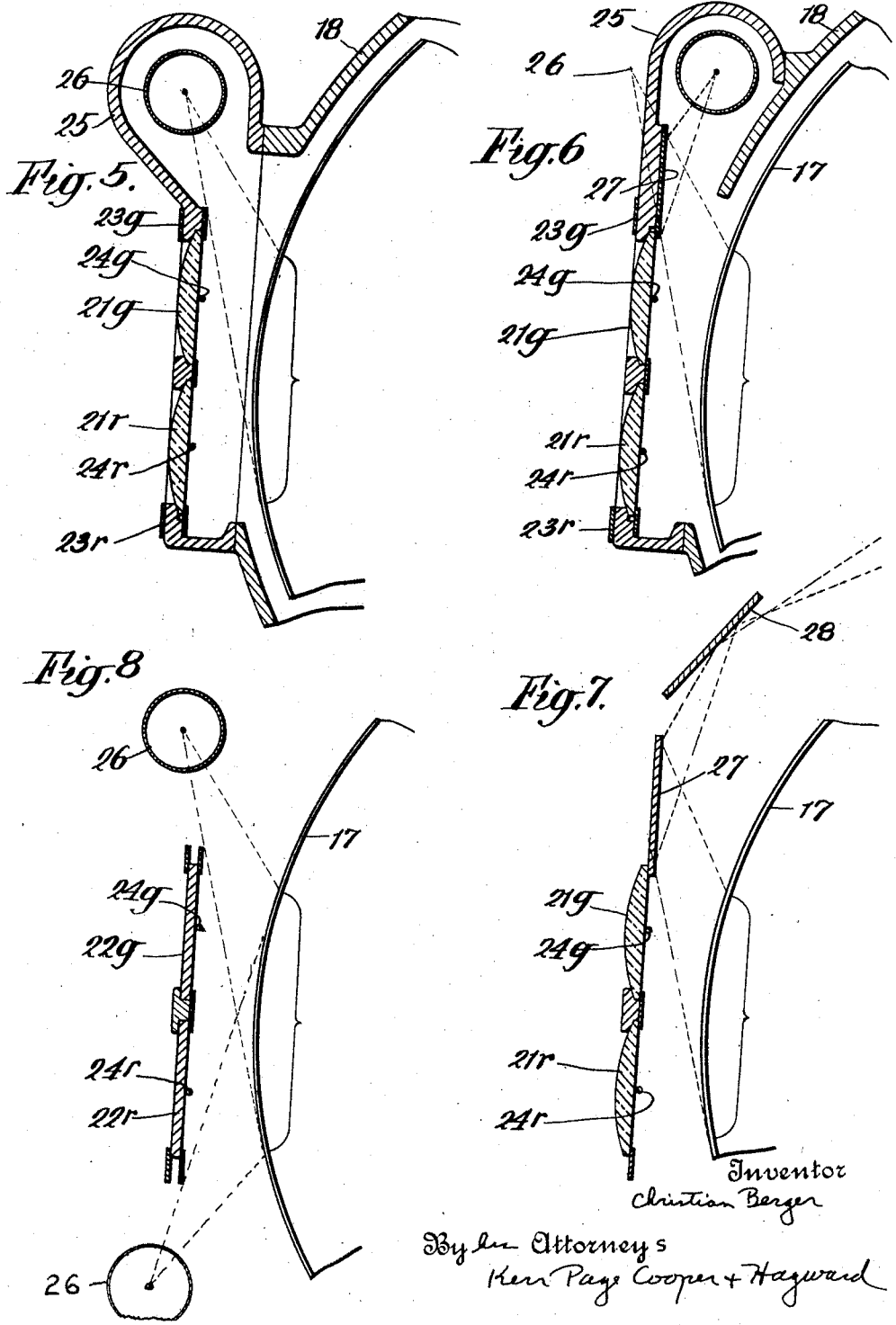

Patented Sept. 11, 1928.

1,684,212

UNITED STATES PATENT OFFICE.

CHRISTIAN BERGER, OF BROOKLYN, NEW YORK, ASSIGNOR, BY MESNE ASSIGNMENTS, TO DAYTON SCALE COMPANY, OF DAYTON, OHIO, A CORPORATION OF NEW JERSEY.

INDICATING CHART AND MEANS FOR VIEWING THE SAME.

Application filed April 28, 1921. Serial No. 465,177.

The present invention relates to improvements in weighing scales and more particularly to improvements in the indicator of the scale to the end that more comprehensible and extensive readings of weight and other factors based upon weight may be secured.

Other objects of the invention reside in the provision of means for increasing the indicating capacity of the scale to the end that a greater number of readings, or more legible readings, may be taken from the weight actuated indicator.

Other objects of the invention reside in the provision of improvements in the drum indicator type of weighing scale having a so-called price chart.

While certain features of the invention have particular utility in connection with the drum type of price scales, the invention in its broad aspects is not limited to this type of scale and it will be understood that the scale illustrated and described constitutes only a preferred form of embodiment of the invention.

In the weighing scale art it has been a common practice to indicate weight and correlated items such as prices upon a chart which is mounted upon a drum and displaced in accordance with weight. These charts have commonly been arranged with a separate column of figures for each price per pound and with usually a single and reverse column of figures for weight amounts. Increase in number of prices has been secured by adding additional columns of figures.

While it would seem comparatively simple to increase the capacity of these charts by merely increasing their size, this has been found impractical in practice since larger charts necessitate larger drums and this increases the weight to be moved by the scale to such an extent as to cause errors in drum displacement due to the friction and inertia of the drum.

Since the chart size has been limited by the operation characteristics of the scale, it has been the practice to condense the size of the figures and use magnifying glasses for reading. However, even with the smallest of figures a limit of capacity for different prices is finally reached and when additional prices are required it is necessary to have a second scale with a differently arranged chart.

In my prior Patent No. 1,295,842 I have shown a computing scale of the drum type having superimposed sets of figures printed in different colors. One or the other set of figures may be read by viewing the same with lights of different colors either by means of vari-colored lights or by means of vari-colored filters. The present invention utilizes the broad principle which is disclosed in the said patent.

With the present invention I utilize a chart which is printed in a particular way to permit the concurrent reading by the operator of double sets of weight and correlated amount numerals. To secure this result certain of the sets of numerals and correlated amounts are printed in one color and on other sets are printed in a different color. The set of numerals of one color are offset relatively to the coordinate set printed in a different color.

By the use of a suitable pair of color filters preferably juxtaposed one over the other it is possible for the operator to read either or both sets of characters without the manipulation of any devices whatsoever, and without changing his position.

The foregoing arrangement of indicating chart and reading appliance permits the number of correlatted amount characters to be largely increased. Furthermore, the size of the characters may be maintained and even increased if the number of different correlated amounts are less than twice the number heretofore placed upon a chart. I may also entirely eliminate the use of lenses for reading, should the characters be of sufficient size for direct reading.

In the drawings:

Fig. 2 is a front elevation of a part of the drum housing.

Fig. 3 is a fragmentary view of the weight-indicating section of the chart.

Fig. 4 is a view showing a portion of the chart with color filter devices arranged in Fig. 5 is an enlarged detail sectional view of the chart, the filters and illuminating devices.

Figs. 6 and 7 show modified methods of illuminating the chart.

Fig. 8 shows a similar arrangement with plain glass filters instead of lens filters.

Figure 1:
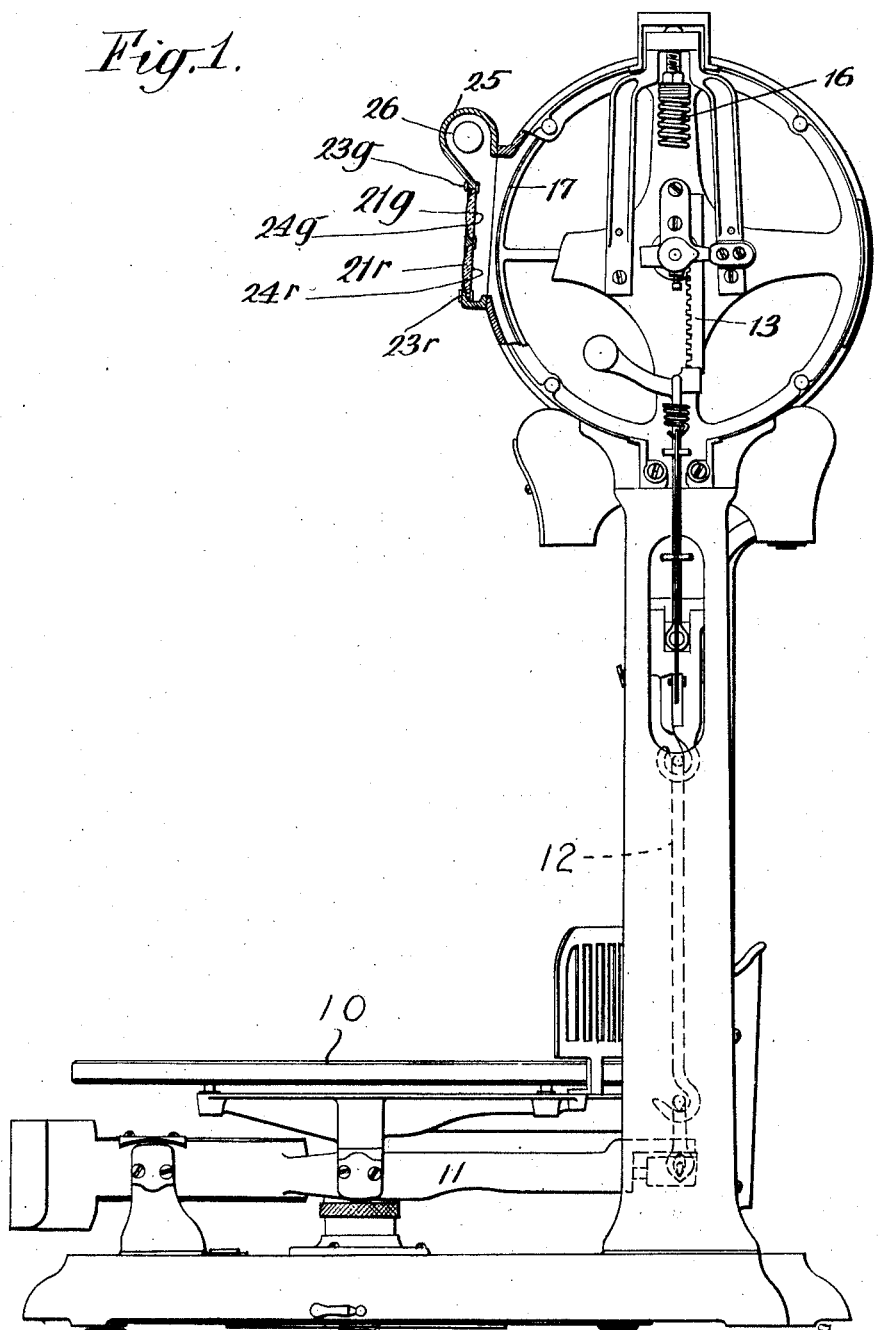
Fig. 1 shows a side elevation of a scale with certain portions broken away to show the interior construction.

The scale to which my invention is here shown as applied is of a type well known in the art. It comprises a platform 10, a main lever 11 suitably fulcrumed and pivotally supporting the platform, and having the usual nose iron connecting to a steelyard 12. The steelyard, through the usual cross connections, is connected to racks 13 which mesh with pinions 14 upon the drum shaft. The applied load is automatically counterbalanced by suitable springs 16. The drum shaft carries light weight spiders which in turn support a chart 17 commonly called a drum chart. The chart is encased in a suitable housing 18. The scale also includes the usual compensating thermostats, a check and a dash pot but as these features are well known in the art, they require no detailed description.

The chart comprises a set of numerals $19^g$ printed in green which designate the weight of the goods. Superimposed upon this set of numerals are complementary sets of numerals $19^r$ printed in red. Numerals $19^g$ and $19^r$ designate the weight of the goods and are disposed adjacent the usual graduation lines which may be printed in black or by superimposed red and green lines. Numerals $19^r$ and $19^g$ are arranged in concurrently ascending arithmetical progressions and the numerals of one set have their zero point offset a certain distance from the zero point of the other set.

Disposed to one side of the weight numerals are other sets of green and red numerals $20^g$ and $20^r$ with correspondingly colored graduation lines. $20^g$ and $20^r$ are correlated to the weight numerals and here represent prices of the commodity weighed. These sets of numerals are likewise arranged in concurrently ascending arithmetical progressions and have their zero points offset a like distance. Disposed in front of the chart are two juxtaposed color filters which may either be in the form of magnifying lenses $21^g$ and $21^r$ or plain glass filters $22^g$ and $22^r$ as shown in Fig. 8. These filters are colored in accordance with the suffix designation. Viewing the chart through $21^g$, numerals $19^r$ and $20^r$ will be visible as black numerals and $19^g$ and $20^g$ will be invisible (see Fig. 4).

Similarly upon looking at the chart through the red filter $21^r$, numerals $19^r$ and $20^r$ will be invisible and $19^g$ and $20^g$ visible in black. It will be understood that there are a plurality of sets of numerals $20^g$ and a plurality of sets of numerals $20^r$. The superimposed groups of a pair of sets are based upon different prices per pound and to provide a simple means for correlating the price per pound with the set and column which corresponds, I provide price scales $23^g$ and $23^r$. These scales are placed alongside the filters as shown and direct the operator's vision to the proper corresponding column of prices which appears through the color filters. Fig. 4 shows that it is possible to not only superimpose numbers for different prices but that the lateral register of columns may be varied. It is therefore possible to both increase the number of prices which can be shown upon a chart and to change the scale to which the numbers and graduated scales are drawn to thereby improve the reading of the displayed result.

Filters $21^g$ and $21^r$ are both provided with suitable reading lines which may be inscribed upon the filters themselves or may be in the form of reading wires $24^g$ and $24^r$, as shown in Fig. 5. The two reading lines are spaced the same distance apart as the offset distances of the zeros of the sets of numerals.

As shown in Fig. 4, it is therefore possible for the operator to concurrently read sets $19^r$ and $19^g$ which are identical and sets $20^r$ and $20^g$ which differ from each other in actual value but which are correlated to the weight values of corresponding sets $19^r$ and $19^g$. This reading may be taken without the shifting or manipulation of any color filter screens and in effect gives a double concurrent reading from a single chart which is displaced according to weight.

In Fig. 5 I have shown one means of illuminating the chart by electric light. Here a housing 25 is provided which supports the filters, price scales, etc., and also supports a light 26. This light extends laterally across the chart and has its filament so located and the housing so proportioned that direct light rays may fall upon the chart and illuminate the area shown between the brackets.

Fig. 6 shows a slightly modified arrangement in which the light is directed by reflection from a mirror 27 onto the chart. The illuminated area is shown by the brackets and the paths of the light from the filament by the dotted lines.

Fig. 7 shows an arrangement which uses a supplemental mirror 28 to receive light from a source entirely without the housing and direct the same upon the reflecting mirror 27.

Fig. 8 is an arrangement similar to Fig. 5 with plain filters instead of magnifying filters.

While the use of artificial light improves the display of the indication, the same is not essential and may be dispensed with. If used I preferably provide the usual form of scale operated switch to cut the light into circuit when a load is applied to the scale. Such switches being well known in the art, require no detailed description.

While I have here shown the related sets of numbers as price numerals, they may designate other items based upon weight. For example, the scale could be provided with one set of numbers graduated in ounces and pounds and a supplementary set could be used based upon the metric system of weights.

What I claim is:—

1. In a weighing scale, a chart and means for displacing the same in accordance with an applied load, a plurality of differently colored sets of numbers thereon, said sets being each arranged in concurrently ascending arithmetical progressions with their zero points offset by a certain amount, a pair of color filters on the same side of said chart each filter rendering visible one set of numbers and rendering the other set invisible, and reading lines associated with each said filter spaced apart by the distance of the zero offsets whereby correlated numbers based upon the same weight may be concurrently read by the operator.

2. The invention set forth in claim 1 in which the color filters are both fixed against movement.

3. The invention set forth in claim 1 in which the color filters are juxtaposed one above the other and are fixed against movement.

4. The invention set forth in claim 1 in which certain of the sets of numbers represent prices and other sets represent the weight of the goods.

5. The invention set forth in claim 1 in which a pair of indicating scales are provided one for each filter, to indicate the value per unit of weight corresponding to the different sets of numbers.

6. A device as set forth in claim 1 in which means is provided for illuminating the chart.

7. A chart comprising a double set of numerals, one set being printed in one color and arranged in ascending arithmetical progression, and a second set of numerals superimposed upon the first set and printed in a different color, said second set comprising numerals arranged in an arithmetical progression ascending concurrently with the first set and having the zero point offset from the first by an amount equal to substantially one unit of the scale of the first progression.

8. In a device comprising a chart adapted to permit the concurrent observation by a single observer of a double set of numerals superimposed thereon, in combination with a chart, a plurality of differently colored sets of numerals thereon, said sets being arranged in concurrently ascending arithmetical progressions with their zero points offset by a particular amount, a pair of reading line means on the same side of said chart, said lines being spaced apart by the distance of the zero offsets, and means for viewing one portion of the chart with light of one color at one reading line and for viewing another portion of the chart at the other reading line with a light of a different color whereby a double reading of correlated amounts may be taken.

9. A computing scale comprising in combination, a cylindrical chart and means for automatically displacing the same in accordance with an applied load, said chart having a plurality of sets of progressive numbers of one color thereon, said chart having also a plurality of sets of progressive numbers thereon of a color different from the first mentioned color, said second mentioned plurality of sets of numbers overlapping the said first mentioned plurality of sets of numbers and the zero points of the sets of numbers of said first mentioned plurality of sets being displaced from the zero points of the sets of numbers of said second mentioned plurality of sets by a distance less than one-fourth of the circumferential length of said chart, a color filter adjacent the normal zero position of the sets of numbers of one color for rendering the numbers of that color predominantly visible, and a color filter adjacent the normal zero position of the sets of numbers of the other color for rendering the numbers of that color predominantly visible.

10. A chart for computing scales having a plurality of sets of progressive indications of one color thereon, and a plurality of sets of progressive numbers thereon of a color different from the first mentioned color, said second mentioned plurality of sets of numbers overlapping the said first mentioned plurality of sets of numbers, and the zero points of the sets of numbers of one color being displaced from the zero points of the sets of numbers of the other color by a distance less than one-fourth of the length of the field of the chart measured in the direction of progression of said numbers.

11. A computing scale comprising in combination, a chart and means for automatically displacing the same in accordance with the applied load, said chart having a plurality of groups of price indications adapted to be viewed upon the same side of the scale, each group including sets of progressive numbers representing products of weight and prices per unit weight of commodities, the numbers of each group being depicted in a color different from the color of the numbers of another group, at least some of the numbers of one color being superimposed on numbers of a different color, the prices per unit weight of the sets of numbers of one group being different from the prices per unit weight of other groups, the price indications of one group being incomplete and supplemented by those of the other groups, and fixed means for rendering sets of each group predominantly visible with respect to other sets.

In testimony whereof I hereto affix my signature.

CHRISTIAN BERGER.